United States Patent [19]

Dilmaghani et al.

[11] 4,405,105
[45] Sep. 20, 1983

[54] AIRFOIL FLAP ACTUATION

[75] Inventors: Hommayoun Dilmaghani, Gessel; Hugo Sgarz, Bremen-Lesum; Hartmut Schulz, Bremen, all of Fed. Rep. of Germany

[73] Assignee: Vereinigte Flugtechnische Werke GmbH, Bremen, Fed. Rep. of Germany

[21] Appl. No.: 250,931

[22] Filed: Apr. 6, 1981

[30] Foreign Application Priority Data

Apr. 10, 1980 [DE] Fed. Rep. of Germany ....... 3013774

[51] Int. Cl.³ .......................... B64C 3/38; B64C 9/20
[52] U.S. Cl. .................................. 244/213; 244/215; 244/216; 74/521
[58] Field of Search .............................. 244/213–219, 244/75 R; 74/520, 521

[56] References Cited

U.S. PATENT DOCUMENTS

| 1,845,644 | 2/1932 | Bardwell | 74/521 |
| 2,246,116 | 6/1941 | Wagner et al. | 244/216 |
| 2,348,150 | 5/1944 | Richter | 244/216 |
| 2,492,245 | 12/1949 | Sutton et al. | 244/216 |
| 2,779,555 | 1/1957 | Danielson | 244/216 |
| 2,973,925 | 3/1961 | Wiele | 74/521 |
| 3,985,319 | 10/1976 | Dean et al. | 244/216 |
| 3,986,689 | 10/1976 | Maltby | 244/213 |
| 4,305,177 | 12/1981 | Feifel | 244/213 |

FOREIGN PATENT DOCUMENTS

| 2114670 | 10/1972 | Fed. Rep. of Germany | 244/214 |
| 858073 | 11/1940 | France | 244/216 |

Primary Examiner—Galen L. Barefoot
Attorney, Agent, or Firm—Ralf H. Siegemund

[57] ABSTRACT

A rear-edge flap is held on an aircraft wing by means of two pantograph-like guide systems carrying swivel heads on which the flap is pivoted. Control arms extend from the guide systems to cause the flap to be pivoted and the guide systems extend the flap. Details concerning bearings and kinematics are disclosed. Application of the invention to all rear flaps of two aircraft wings is described.

13 Claims, 9 Drawing Figures

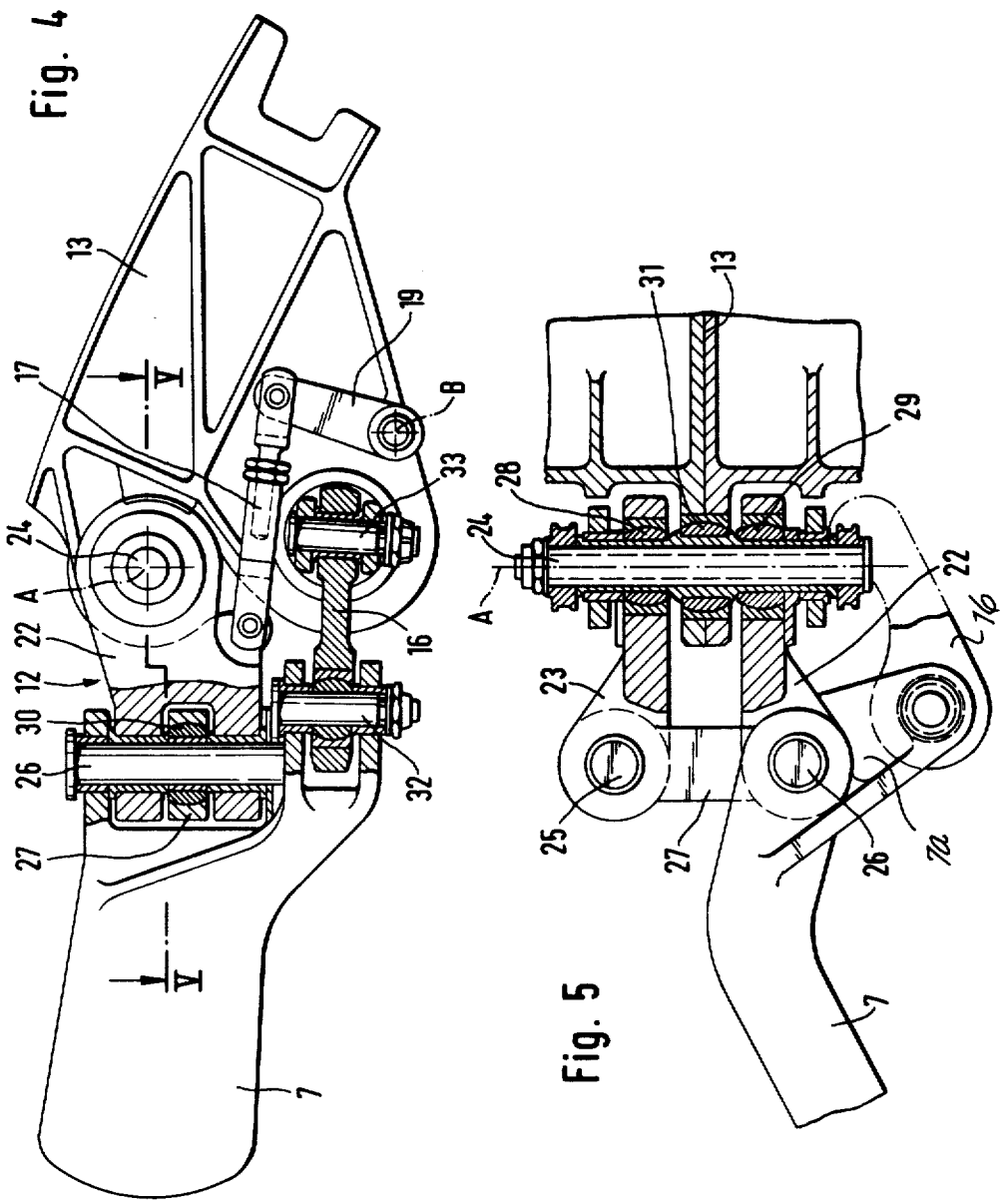

AIRFOIL FLAP ACTUATION

BACKGROUND OF THE INVENTION

The present invention relates to actuation of a flap on a wing or airfoil.

Flaps on aircraft wings serve a variety of purposes including, for example, a lift assist. These latter types of flaps are usually designed so that the flaps themselves as well as any actuating mechanism offers little drag resistance, particularly during cruising. This condition is particularly important for so-called supercritical wings being designed for low drag because the flap-guiding structure may, in effect, tend to increase that drag.

Flap actuations are, for example, of a rail construction; or newer and less expensive ones are designed as parallelograms for extending the flaps by means of hinge structures having horizontal axes. These structures require extensive covering for avoiding undue drag.

U.S. Pat. No. 2,973,925 describes a leading edge slat which is to be extended into a position in front of and below the airfoil by means of aerodynamic forces. When retracted, the slat actuation is covered by the slat. The movement of the slat is carried on a cylindrical or conical surface.

DESCRIPTION OF THE INVENTION

It is an object of the present invention to provide a new and improved actuating mechanism for flaps or airfoils.

It is a particular object of the invention to provide such an actuating mechanism which is as failure-proof as possible, establishes a well-defined flap displacement, and can be stopped and held in intermediate positions between full retraction and full expansion.

It is a further particular object of the invention to provide such a flap-actuating mechanism which permits full covering for minimizing drag during cruising; moreover, the flap should permit maximum lift/drag ratio during take-off and maximum lift during landing.

In accordance with the preferred embodiment of the invention, it is suggested to actuate a wing flap by means of a pantograph-like guide system having a head to which the flap is pivotally linked, and further having control arms acting on points of the flap spaced from the pivot axis to permit pivoting actuation as the guide system pushes the flap out.

Mounting the flap to pivot heads permits the actuation under a sufficient degree of freedom of motion which will prevent binding and undue tilting during retraction and extending motions. Each guide system is to have its own gearing for transmission of the driving motion. This is particularly important as two such guide systems are to be provided per flap so that, in case of failure in one of the guide systems, the other one can still move the flap in and out, hold it there or in an intermediate position.

The swivel joints of the guide system and the connect points of the control arms or rods are appropriately selected in relation to the plane of the wing or airfoil in order to obtain a flap extension in which the flap is held in a near-horizontal disposition for a relatively large travel path (Fowler effect), and only in the last portion of the extension does the flap angle change rather drastically. This principle is particularly suitable for rear edge flaps which have to have different dispositions during take-off and landing (with full retraction during regular cruising).

For operational safety reasons, ball and socket joints should be used which permit a swivel-and-turning motion but also swivelling in other directions; basically, a three-dimensional swivel action is to be provided over a limited range with a predominant direction (axis) of turning. Binding and other impediments are to be avoided.

A flap is basically held by two guide systems, each system having a swivel head, one of which is constructed for lateral play, the other one is not. The lateral play may occur in a direction parallel to the flap swivel or pivot axis.

The flap is preferably provided with an auxiliary flap which is operated by a follower control. The guide systems are preferably provided at their inputs with a planetary gear set driven by a worm gear. This gearing is an individual one for each guide system; but they will all be driven in unison, except that slight right-wing-/left-wing trimming may be needed for offsetting imbalance. Planetary gear sets with worm gears have the advantage that one can stop at any position and hold the flap there without additional latching.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 4 is an enlarged view of a portion of the structure shown in FIG. 3;

FIG. 5 is a section taken along lines V—V in FIG. 4;

Proceeding now to the detailed description of the drawings, FIG. 1 illustrates a guide-rod-linking and control system 1 being composed of two branches 2 and 3, the latter being shown in phantom lines only in the extended position, the former (2) being fully drawn for a retracted disposition of the guide system. There is a second such system 1 provided for the same flap at some location along the wing's span (FIGS. 6 and 7).

Figure 1:
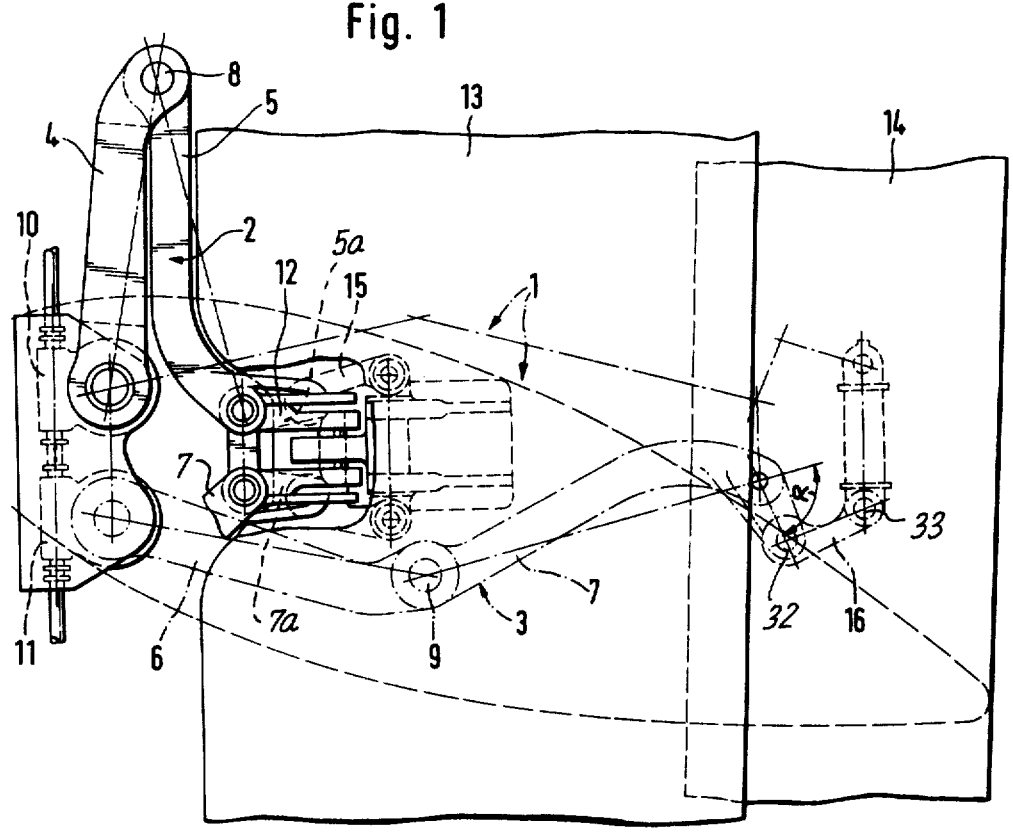
FIG. 1 is a top elevation of a flap actuator in accordance with the preferred embodiment of the invention for practicing the best mode thereof.

Branch 2 is comprised of two hinged-together rods 4 and 5, there being a hinge 8 accordingly. Analogously, branch 3 is comprised of two hinged-together rods 6 and 7, there being a hinge 9. The hinge axes extend at least approximately perpendicular to the plane of the drawing of FIG. 1. The branches together form a pantograph-like construction.

The rods 4 and 6 are respectively connected to rotating gear drives 10 and 11 which are connected to the wing structure proper, there being a common drive shaft, to be explained more fully below. The drives are constructed as planetary gear sets with worm gear input. This type of construction permits ready halting of the drive in any position without further latching. Moreover, these types of gear drives require little maintenance and do not project from the outer contour of the aerodynamic wing profile. The outer rods 5 and 7 in the guide pantograph and system 1 have their front ends interconnected by a guide and swivel head 12. A wing flap 13 is pivotally linked to that head.

It will be appreciated that a second pantograph-like guide system is provided and linked to another point of flap 13. Moreover, in the present example, it is presumed that flap 13 is the main flap of a rear-edge flap system. An assist or auxiliary flap 14 is linked to flap 13, to be described in greater detail below.

The outer rods 5 and 7 are in addition provided with angled-off projections 5a and 7a, to which control arms or rods 15 and 16 are respectively linked by ball and socket joints. These rods 15 and 16, in turn, are connected to flap 13, but at a distance from the turning axis A of head 12, in an approximately 5 o'clock position.

Figure 2:
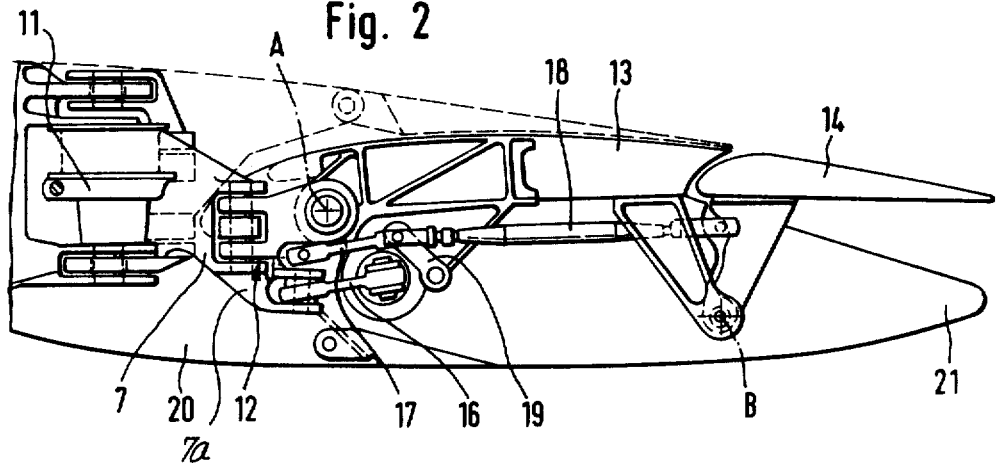
FIG. 2 is a side view of and into such a flap actuator as per FIG. 1, showing a flap in a retracted position.
Figure 3:
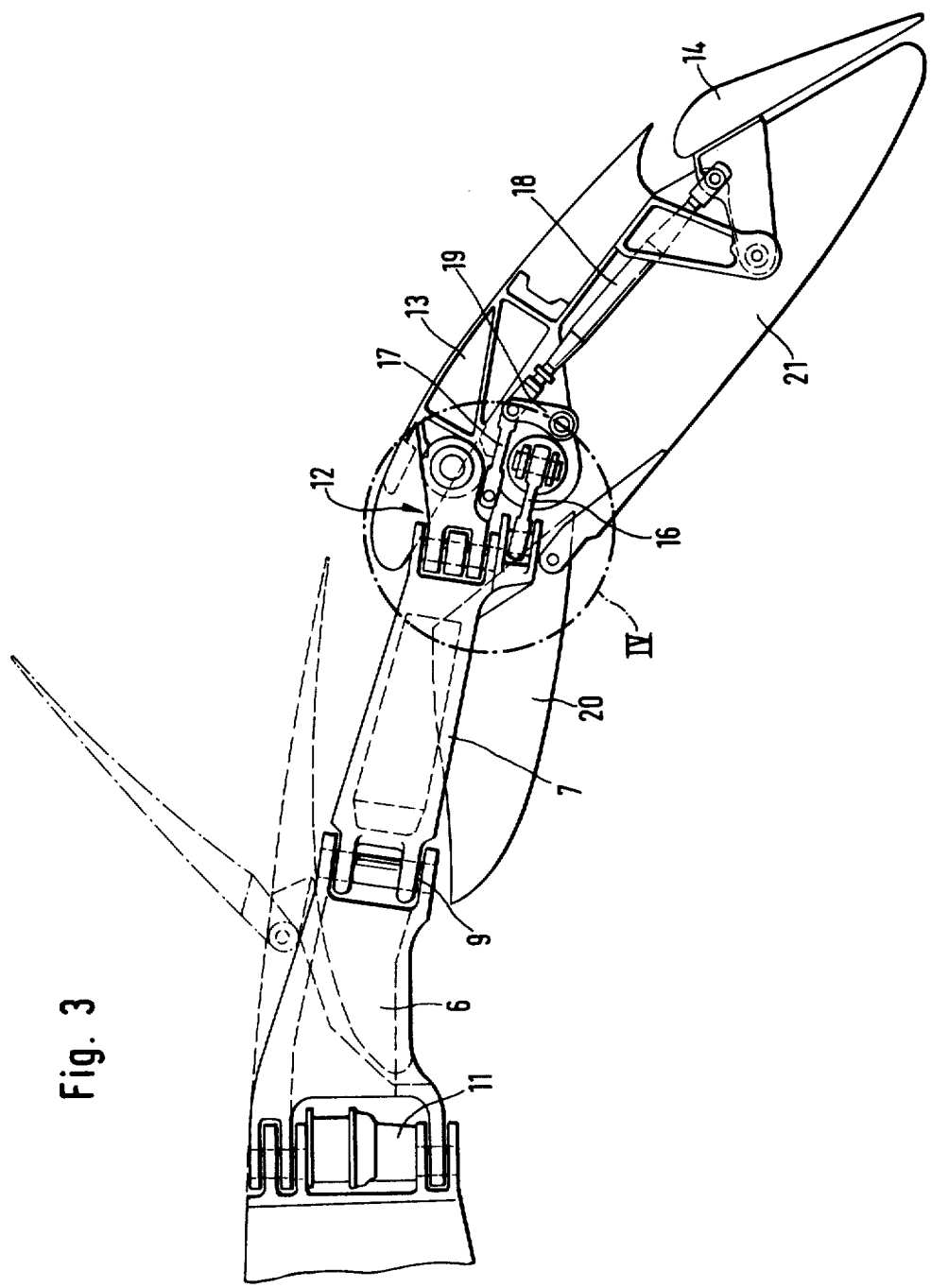
FIG. 3 is a view similar to FIG. 2, but showing the flap as extended.

FIGS. 2 and 3 illustrate this linkage system from the side, but in different dispositions and degrees of extension of guide system 1. FIG. 3 illustrates, in particular, the fully extended position for flap 13. These figures show in addition a linkage system which includes two hinged-together arms 17 and 19 cooperating with an arm 18 for providing a follower control for flap 14. There is a second such follower control, being symmetrically arranged on head 13; and together, they act on flap 14 at points spaced from the pivot axis (B) of flap 14.

FIGS. 2 and 3 illustrate also flap covers 20 and 21, the front portion (20) thereof being folded away for extending the flap in order to avoid impeding of linkages.

FIGS. 4 and 5 illustrate the head 12 and adjacent parts in greater detail; the position of the parts has validity for an extended flap. The swivel and control head 12 is comprised of two pieces 22 and 23 which are symmetrically disposed to each other. One end of each of these pieces 22 and 23 is connected to a pin 24 which interconnects them and establishes the turning on pivot axis A of flap 13. The other ends of head pieces 22 and 23 are rotatably mounted on hinge pins 25 and 26, respectively. These hinge pins are respectively mounted to the rods 5 and 7 and are further interconnected by a bar 27.

Since the bearing pin 24 is connected to the head pieces 22 and 23 by means of ball and socket joints 28 and 29, parts 22, 23, 24, and 27 together establish a quadrilateral link. Bar 27 is also mounted to pins 25 and 26 by means of ball- and socket-type bearings 30 so that the two branches 2 and 3 can move relative to each other and perpendicularly to the plane of the drawing of FIG. 5.

The main flap 13 is mounted on pin 24, also by means of a ball and socket joint. Thus, flap 13 can turn on axis A and swivel to some extent about other axes through the ball's center. The control rods 15 and 16 are likewise mounted on special bearings so that they can move in all directions in addition to the principle turning motion about the respective pins 32 and 33.

Figure 6:
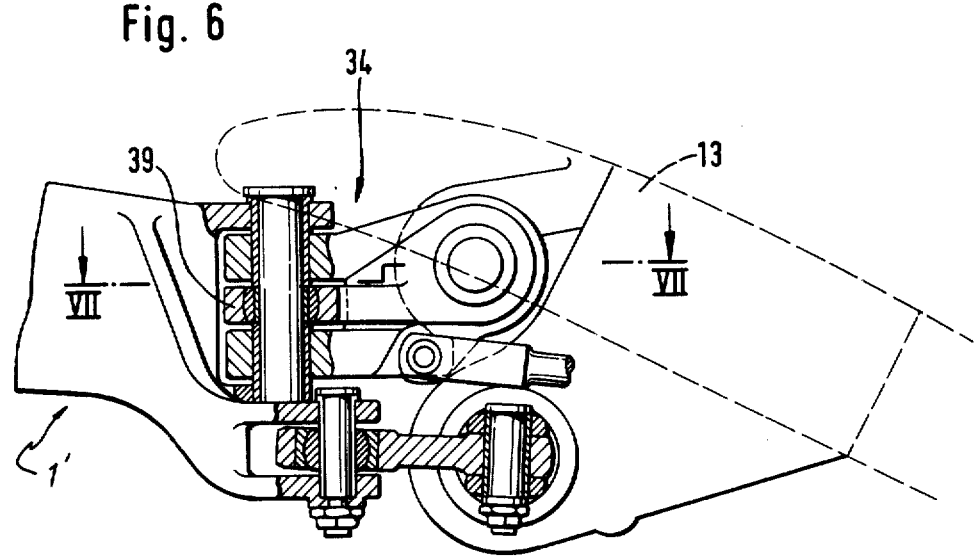
FIG. 6 is a view similar to FIG. 4, but showing a different connection points to the same flap.
Figure 7:
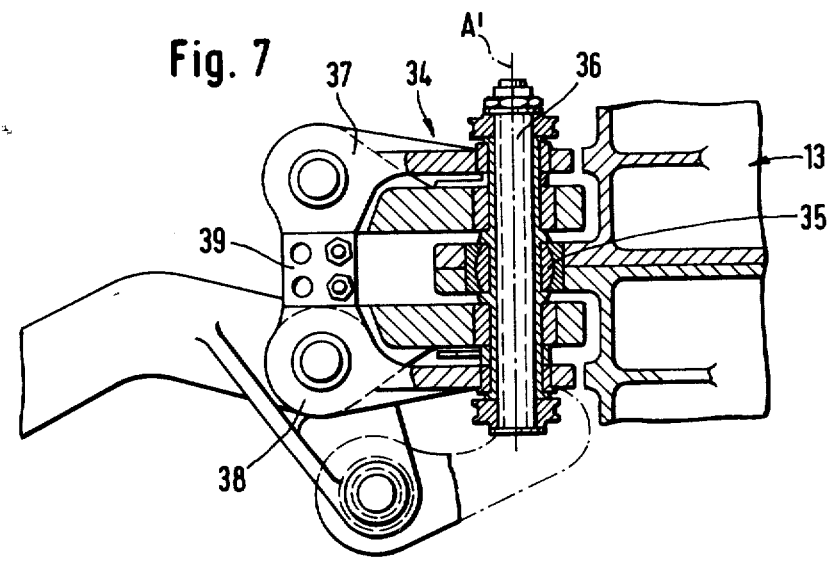
FIG. 7 is a section taken along line VII—VII in FIG. 6.

FIGS. 5 and 6 illustrate the second connect and control point of flap 13. The head 12 in FIGS. 4 and 5 is provided as a loose-fitting bearing-type device; but a head 34 of that second point is depicted in FIGS. 6 and 7 as tight bearings, permitting a lesser degree of freedom (no lateral play). The main flap 13 is here also mounted on a bearing pin 36 by means of a ball and socket joint 35, establishing a pivot axis A!. However, pin 36 is fixed by means of two lateral protrusions or extensions 37 and 38 of a bar 39 so that pin 36, protrusions 37 and 38, as well as bar 39 form a rigid assembly. Thus, unlike the mounting of head 12, head 34 is not per se a linking quadrilateral that is movable in the plane of FIG. 7. Otherwise, the parts are similar to those of FIGS. 4 and 5.

Figure 8:
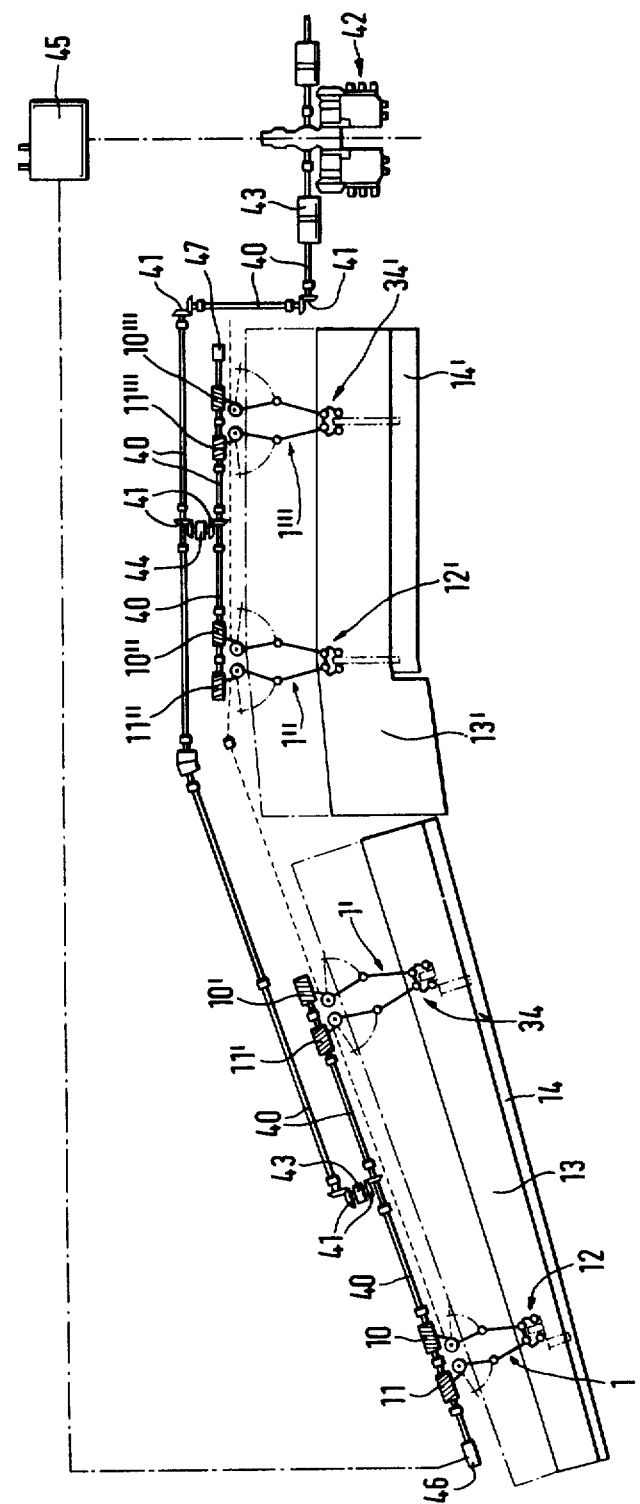
FIG. 8 is a somewhat schematic illustration of a control and actuating mechanism for controlling a rear edge flap system of an airfoil.

Proceeding now to FIG. 8, the figure shows two flaps 13 and 13' and a common actuating mechanism for these flaps. The two linking and guiding systems 1 and 1' are shown schematically for the two heads 12 and 34. There are two similar guide systems 1'' and 1''' respectively for heads 12' and 34' for controlling the disposition of the second flap (13'). This flap has also a flap extension 14'.

These four guide systems 1 through 1''' are operated by rotating gears 10, 11, 10', 11', 10'', 11''', all of which are being driven by linked shafts 40 and angle gearing 41. Reference numeral 42 refers to a central drive for all of the guide systems 1 through 1''', to operate flaps 13 and 13' in unison. Moreover, there is a similar system for the rear flaps of the other wing. The drive train includes, in addition, torque limiters 43 and 44. Should, for any reason, a portion of the drive system be blocked, the torque limiter would then, in effect, decouple. This is an added safety feature. Reference numeral 45 refers to a symmetry-asymmetry controller being connected to a sensor 46 and another one at the other wing end, to control drive 42 for trimming the adjustment of the flaps. The heads 12' and 34' are constructed analogously to the heads 12 and 34, as per FIGS. 4 through 7.

Figure 9:
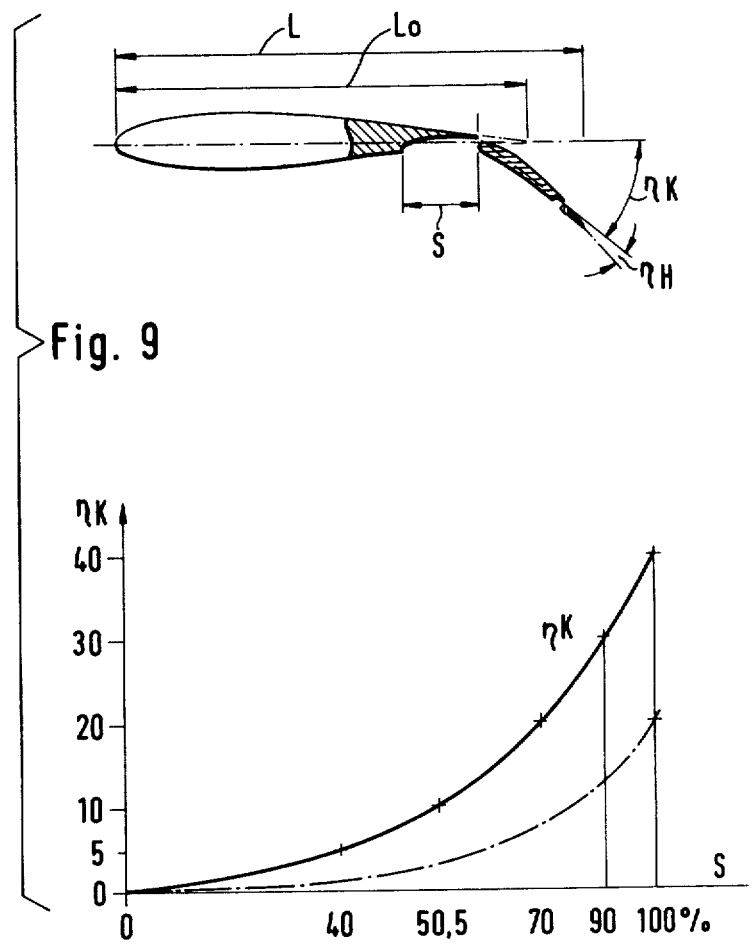
FIG. 9 is a graph showing flap angle $\eta$ in dependence upon the relative degree of flap extension.

The kinematics of the entire arrangement and its operation will be described next (see also FIG. 9). The diagram of FIG. 9 shows flap angle α versus its relative extension. The schematic wing profile above the diagram just explains and depicts the parameters and variables. As to extension S, 100% simply means: a fully extending flap.

The central drive unit 42 drives the shafts 40, gears 41, and worms 10 through 10''' and 11 through 11''' to, thereby, move the guide systems 1 through 1''' which, in turn, cause their control and swivel heads 12, 12', and 34, 34' to move flaps 13, 13' on curves which are situated in the respective cross sectional planes of the wing. The common drive train ensures synchronism of operation of the various guide systems 1, and so forth. The flaps are pivoted and moved toward the rear of the wing. The contour of that curve(s) along which the flaps move is given by the angle under which the respective axes of the swivel joints of a guide unit are inclined toward the vertical. Other parameters here are contour and length of the rods of which the guide systems are composed (4, 5, 6, 7). Also, the length of the control rods, such as rods 15 and 16, and the offset location of the connection of these control rods to the flap in relation to the respective hinge axis (A, A1') are parameters that control the relative swivel movement of the flap.

During the extension movement of the guide systems, the inclination of the flaps relative to these guide systems and their rods is continuously changed in that the linking points of the control rods 15 and 16 to the respective guide system (e.g., the axis of pin 32) migrate in outward direction and along a circle. In the illustrated example, an angle $\alpha$ is defined (FIG. 1) between an extension 5a or 7a of rod 5 or 7, constituting the linkage points, and the extension of the rod (5 or 7) as a whole. This angle $\alpha$, and the length of the control rods (15 or 16) are selected so that the flap 13 is pivoted up at first during the extension movement which is counterclockwise in FIG. 2. In other words, the geometry is so chosen that the control rods are at first a little pushed forward relative to head 12, causing this small counterclockwise motion of the point of connection of the control rods to the respective flap resulting in this small counterclockwise pivoting of flap 13 (or 13'). Only after the extension has progressed to a considerable degree is the flap pivoted down, in that the control rods cause (as, for instance, per the plane of FIG. 4) the connect point to the flap and, therefore, the flap to pivot clockwise. If the flap were held, movement of the respective heads (12, etc.) along the chosen path would result in a consistent upturning of the flap. But since the flap is not held, the movement as it actually occurs is as depicted in FIG. 9.

FIG. 9 reveals that the inclination of flap 13 relative to the horizontal ($\eta$) changes only very little for a rather large range of outward extension; that is to say, the flap remains almost horizontal for about 50% of its extension path. This range is of particular interest as it increases the lift-producing wing area while drag is increased to a minor extent only. This is quite important for takeoff.

For a large extension of the flap, the angle $\eta$ increases drastically. The same is true also for the flap 14. In the end position, angle $\eta$ is quite large, and the lift-producing area as well as drag have, relatively speaking, maximum values. This is the configuration used during landing.

It should be noted that the system permits the extension to be stopped in any position, just by halting the drive.

The use of ball-and-socket joints in the respective bearing and support points ensures that the wing flaps can be extended and retracted with minimal friction. This is even true if, due to wind forces, the wings are a little tilted relative to their theoretical pivot axes. Without ball-and-socket joints, the flaps and linkage would bind.

It is conceivable that one of the guide systems branches breaks. The three other branches can still move the flap for retraction or extension.

We claim:

1. In an airfoil, a flap, an actuating mechanism for moving the flap, comprising:
    two pantograph guide systems each being pivotally secured to the airfoil at points spaced along the span of the airfoil, each guide system having two branches pivotally linked to a head, there being two heads accordingly;
    means for each of the guide systems, for pivotally linking respectively the heads to the flap for pivoting on approximately horizontal axes, the axes extending transversely to a direction of the flap movement, said means for respectively pivotally linking the heads to the flap including essentially vertical pins accordingly, one of the pins positively permitting lateral play to a larger extent than the other pin;
    two control rods for each of the guide systems respectively extending from the two branches of the respective guide system and being pivotally linked thereto as well as pivotally linked to the flap at points in each instance being spaced from the respective one of said axes so that, upon expansion of the guide link for extension of the flap, the flap is pivotally actuated for pivoting on said horizontal axes; and
    drive means connected for extending and retracting the guide systems.

2. The actuating mechanism as in claim 1, comprising:
    ball and socket joint means for mounting the respective head on the respective pin, the pin being mounted to the head.

3. The actuating mechanism as in claim 2, the pin being mounted to the head by means of ball and socket joint means 4. The mechanism as in claim 1, wherein each of the branches has extensions beyond respective points of pivoting to the respective head, the rods being pivoted to said extensions.

5. The mechanism as in claim 1 or 3, the control rods being linked to the flap by ball and socket joint means.

6. The mechanism as in claim 1, the drive means including two drive systems respectively for the guide systems and further including a common drive input for the two drive systems.

7. The mechanism as in claim 1 or 6, the drive means including rotating drive and gear means coupled to the guide system and the airfoil for actuating the guide system.

8. The mechanism as in claim 7, the drive and gear means including a worm-driven planetary gear set.

9. The mechanism as in claim 1, there being an auxiliary flap on said flap and including follower control means linked to said auxiliary flap and to said head to obtain pivoting of the auxiliary flap about another axis.

10. The mechanism as in claim 9, the follower control means including a control arm pivotally connected to the flap and a pair of control rods connected to said arm and respectively connected to said head and to said auxiliary arm.

11. The mechanism as in claim 6, including a torque limiter.

12. A plurality of mechanisms as in claim 1 as used to operate a plurality of flaps.

13. The mechanism as in claim 12, as used to operate flaps on two wings, including asymmetric monitoring means for affecting the drives on the two wings differently.

* * * * *